Figure 1:
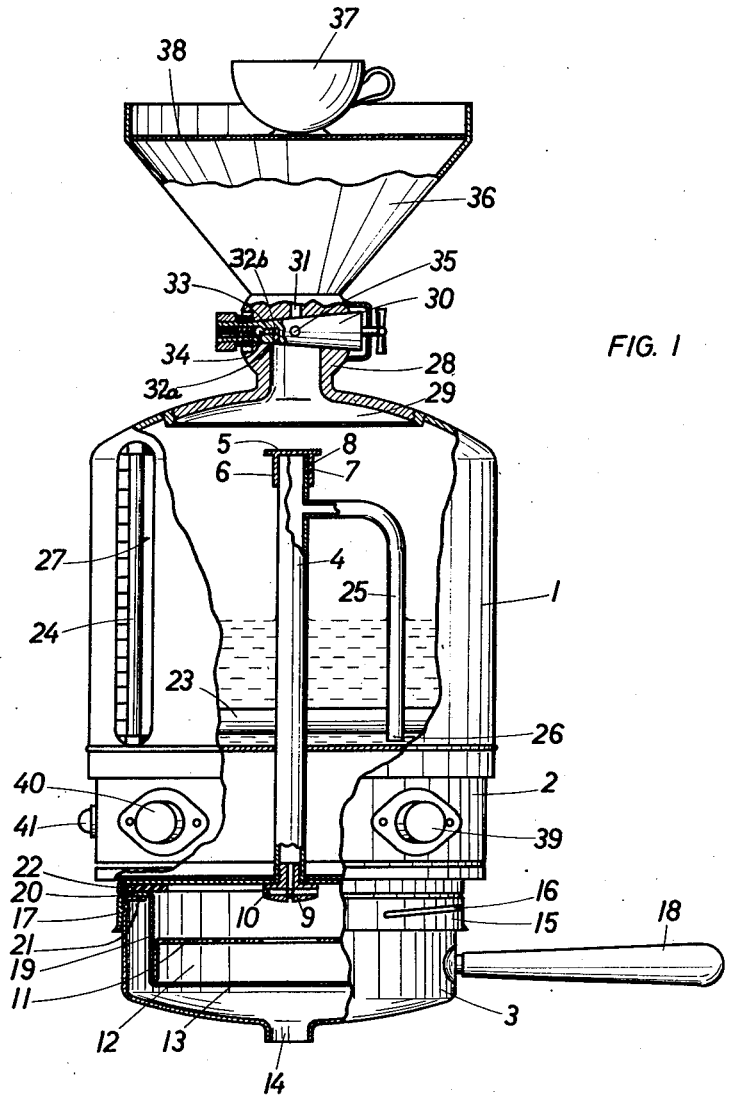

June 18, 1957 T. H. STIEBEL 2,796,018
HEATED BEVERAGE PREPARATION APPARATUS WITH SELECTIVELY
ADJUSTABLE MODES OF OPERATION
Filed Aug. 6, 1954

INVENTOR.
Theodor H. Stiebel
BY
ATTORNEY

United States Patent Office 2,796,018
Patented June 18, 1957

2,796,018

HEATED BEVERAGE PREPARATION APPARATUS WITH SELECTIVELY ADJUSTABLE MODES OF OPERATION

Theodor H. Stiebel, Holzminden, Weser, Germany

Application August 6, 1954, Serial No. 448,343

3 Claims. (Cl. 99—293)

This invention relates to hot beverage preparation apparatus of which the mode of operation is selectively controllable to enable the prepared beverage to meet different taste preferences of the beverage consumers.

As is known, the taste of hot beverages, such as coffee or tea, differs with different modes of preparation. The present state of the art differentiates between two pressure methods of beverage preparation with boiling water in which the water passes but once through the usually comminuted brewing ingredients, namely, the high pressure of "expresso" method and the low pressure or "dripcolator" method. For completeness sake, mention is made also of two other methods, the "percolator" method, a low pressure method, and the substantially pressureless manual pouring and filtering method. In the high pressure expresso method, the boiling water, because of the high pressure, is at a temperature above 212 degrees F., and under the high pressure passes very quickly through the brewing ingredients. The beverage so prepared tastes quite differently from the same type of beverage prepared by other methods, for example by the mentioned dripcolator method. The latter, while based on the same general pressure principle, uses pressures but slightly in excess of atmospheric and hence causes the boiling water, at a correspondingly lower boiling point, to pass at a lesser speed through the brewing ingredients. The percolator method is, in its pressure aspect, like the dripcolator method, differing therefrom in that boiling water is continuously circulated at the boiling point through the identical brewing ingredients. If percolation is continued for too long a period, the point at which desirable elements are still added to the taste of the beverage from the solid brewing ingredients is often exceeded, and the more bitter tasting elements are passed into the beverage. In the pressureless pouring and filtering method, boiling water is usually poured over the brewing ingredients by hand. Each taste of the two most common hot beverages, coffee and tea, has its devotees; hence apparatus for the preparation of these beverages should be flexible in its modes of operation.

It is an object of my invention to provide a beverage preparation apparatus which is selectively adjustable to different modes of hot beverage preparation thereby to permit catering to the taste preferences of the consumers.

It is a further object of my invention to provide a hot beverage preparation apparatus which is continuously adjustable between the opposite extremes of high pressure preparation and practically pressureless preparation with boiling water or steam.

It is still a further object of my invention to provide means in a hot beverage preparation apparatus whereby the particular mode of preparation may be interrupted repeatedly or may be terminated, and the apparatus adjusted to a differing mode of operation.

Figure 2:
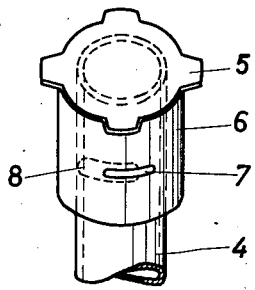

The foregoing and other objects of my invention will be more readily understood from the following description of an illustrative embodiment thereof taken in conjunction with the annexed drawing in which:

Figure 1 is an elevational view, partially broken away and in section, of an illustrative embodiment of the hot beverage preparation apparatus of my instant invention; and Figure 2 is a perspective view, on an enlarged scale as compared to Figure 1, of the upper end of the drain pipe, its cover, and the variable slit pressure control means of such illustrative embodiment.

The hot beverage preparation apparatus of my instant invention comprises an upper enclosure 1, an intermediate enclosure 2, a concentrate enclosure 3, all axially aligned vertically and having a substantially continuous cylindrical surface. Disposed centrally of the container assembly and extending vertically from the upper or steam region of the upper enclosure 1, through the intermediate enclosure 2 and into the upper region of the concentrate enclosure 3, the drain tube 4 at its upper end has a formed cap or cover 5 integral with a cylinder 6 rotatably supported thereon. Cylinder 6 has a circumferential slit 7 therethrough of a predetermined length and adapted to register with a substantially equally long slit 8 through the drain tube 4 in varying degrees upwardly from a minimum opening, depending on the mode of operation desired at the time, as below described. The registration of slits 7 and 8 with each other is varied manually or with the aid of a formed key, not shown, fitting over the formed cover 5, insertable into enclosure 1 through a normally closed opening, for example through passageway 29. In the lower end of drain tube 4 within the concentrate enclosure 3, a distributing nozzle 9 is threaded and has any desired number of orifices 10 to spill the boiling water flowing through drain tube 4 over the perforated distributor plate 11 of the concentrate container 12. With the particular, and preferably comminuted, concentrate in container 12 then, the brewed hot beverage will flow through the perforations of the bottom 13 of the container 12 and through the outlet 14 from the enclosure 3.

Affixed to the bottom of the intermediate enclosure 2, the cylindrical shell, having its lower end open to receive the upper end of container 3, has a detent 16 starting from the edge of the lower end of the shell in the form of a thread of one turn or so, forming an internal thread on shell 15 registering with a corresponding detent 17 in enclosure 3 and starting at its upper edge. By rotating the enclosure 3 by its integral handle 18 through one turn in one direction, enclosure 3 is thus tightened up and supported by shell 15, while so doing in the other direction disengages the enclosure 3, permitting access to the concentrate container 12. Container 12 has its bottom 13 integral with a hollow cylinder 19 having an integral upper annular outwardly extending flange 20 which normally rests on the inwardly projecting annular flange 21 integral with the upper end of the enclosure 3. It will be noted that the spacing between cylinder 19 and enclosure 3 provides an air gap which prevents the concentrate container 12 from cooling off too quickly and also keeps the enclosure 3 relatively cool to the touch. Packing ring 22 affixed to the bottom of the intermediate enclosure 2 enables sealing rather tightly between the annular flanges 20 and 21 and the intermediate enclosure so that no boiling water or steam can escape from within enclosure 3 at this region or be splashed from within as the result of boiling water flow through orifices 10 onto distributing plate 11, for example. Having unscrewed enclosure 3, the perforated distributing plate 11 with its integral spacer cylindrical wall is readily removed, enabling the brewing ingredients to be inserted into, or removed from, the container 12 as may be required.

The upper enclosure 1 has an electric, immersion type electrical heater 23 therewithin near its bottom, and a glass gauge tube 24 positioned within a vertical, radially inward, detent of the cylindrical wall of the upper container 1, the bottom of the tube 24 communicating with the interior of the container so that the level of the water therein is indicated by the gauge. A riser tube 25 has its upper end connecting with the upper end of drain tube 4 immediately below its slit 8, while the lower open end 26 of the riser tube is near the bottom of the enclosure 1. A reference mark 27 on gauge 24 indicates the level at which the water within the enclosure 1 is just below slits 7, 8. By filling only until the gauge reading is at the reference mark, the overflow of cold water, through slits 7, 8 and through the brewing ingredients in concentrate container 12, is avoided. A fitting 28 is integral with the central region of the top wall of the enclosure 1 and has a central passageway 29 connecting to the upper or steam interior region of enclosure 1, the passageway 29 being normally blocked by a valve plug 30 from connecting to the outlet 31 of relatively small diameter compared to that of passageway 29. Through circumferential groove 32a in conjunction with the radial bore 32b and furthermore with the axial bore 33 in plug 30, the passage 29 is normally free to eject steam against the spring-pressed ball valve 34 within the axial bore 33, which spring valve thus acts as a safety valve against excessive steam pressures. The diametrical bore 35 through the plug 30 is adapted on rotation of the plug 30 to permit steam to flow through the outlet 31 but is normally positioned to block passageway 29.

As an auxiliary, but not absolutely essential, device the funnel-shaped member 36 may be detachably secured on and supported by fitting 28. Containers, such as cup 37, intended for the hot beverage, may be stored on the perforated screen 38 within the funnel 36. By opening outlet 31, the beverage containers so stored are preheated by the escaping steam. If desired, funnel 36 can also be used as an auxiliary means for pouring water into container 1.

The intermediate container 2 is essentially a convenient housing for the water supply connections and the electrical line connecting elements, of both of which details are not shown, except that as to the line supply there are shown the externally accessible connect push-button 39 and the disconnect push-button 40, and the signal lamp 41 indicating when current is applied to heater 23.

In operation, assume that slits 7 and 8 are so positioned relative to each other, by rotation of the cover 5 on drain tube 4, that a minimum opening through cylinder 6 and drain tube 4 results, through which air and steam may pass from above the water level within the enclosure 1 and into the interior of tube 4. As the heater 23 heats up the water, water vapor is gradually released therefrom, acts not only on the free surface of the water within enclosure 1 per se but also, by way of the predetermined minimum slit opening 7, 8 on the free surface of the water column within the riser or siphon tube 25. As the vapor is released but gradually, and the air above the water level expands relatively slowly with the rise in temperature, no differential pressure is built up which might force the still not boiling water from enclosure 1 through the riser tube 25 and over into drain tube 4. However, when the water boils, steam is generated—which means a rapid increase in volume, some 1500-fold as is known. Now, the enormously increased volume of steam, cannot freely pass through the small opening defined by slits 7, 8 as fast as the increase in volume, and that portion thereof which does pass through the predetermined restricted opening so defined passes as fast as possible therethrough resulting in a lower pressure on the free level of the water in riser tube 25 than that which now prevails on the free level of the water in enclosure 1 per se. The differential pressure so produced hence drives the boiling water rapidly through the riser tube 25 and over into the drain tube 4 until the water is completely drained thereunder from enclosure 1 to the level below the open riser tube lower end 26. The superheated boiling water flows from the drain tube 4 through the concentrate container 12 and its contents, and the resultant brewed beverage is emitted at outlet 14. It is thus obvious that the pressure control means, consisting in this instance essentially of relatively displaceable slits 7, 8, was thus adjusted to produce the beverage by the high pressure expresso method.

Now if the setting of the slits 7 and 8 relative to each other is such that they define an increased opening between the water enclosure 1 and the drain tube 4, the differential pressure built up when the water boils becomes the lesser the greater the opening up to a maximum. As long as there is a differential pressure developed, the boiling water is forced up the riser tube 25 and over into the drain tube 4 but at a slower rate depending on such differential pressure. At such settings then, the mode of operation is of the dripcolator type, and as the opening defined by the slits 7, 8 approaches its maximum, the differential pressure is actually very slight, and the flow of boiling water up the riser tube 25 and over through the drain tube 4 is increasingly sluggish.

The predetermined maximum opening definable by the slits 7 and 8 is selected of the magnitude that practically no differential pressure is produced by the generated steam. Thus, in the full open position of the slit pressure control means, the generated steam passes through the slits 7, 8 and into the drain tube 4 through the concentrate container 12 and the outlet 14. It is to be noted that the steam so passing through the drain tube 4 is at a temperature of 212 degrees F., and passes through the perforations of distributing plate 11 and of container bottom 13, which perforations are relatively small. Hence a pressure reduction here takes place, and since the pressure beyond the distributing plate 11 and the concentrate container 12 is less, water has a lower vaporization temperature at such regions, that is, any condensation formed in the drain tube 4 due to the heat loss by the steam, will evaporate or post-steam at such regions.

In the preparation of hot alcoholic beverages with steam, it is to be noted that such preparation is not based on any after-steaming operation by rather on the fact that with the very large dimensioning of the maximum slit opening, no differential pressure is developed at such maximum opening as no pressure reduction by way of the slit opening then takes place. No boiling water is emitted and the path of the generated steam is from container 1, through slits 7 and 8, drain tube 4, orifices 10, plate 11, container 12 and outlet 14.

The steaming operation just described of my apparatus is particularly expeditious in the preparation of alcoholic, or fruit juice, hot beverages. The latter are mixed cold and then heated directly in the vessel from which they are consumed by introducing thereinto steam from the outlet 14, thereby heating this type of beverage in a small fraction of the time heretofore normally required.

Between the extremes of adjustment then, that is, between the expresso method on the one hand and the vapor method on the other, all the intermediate modes of beverage preparation in which boiling water passes once through brew ingredients, are obtainable by selectively adjusting the pressure control means, that is, by controlling the magnitude of the opening defined by slits 7 and 8. Any number of low pressure or dripcolator stages may be had.

If desired, the minimum opening through slits 7 and 8 may be made zero, and the expresso method practised in such case by using the valve means comprising plug 30 and bore 35 as the pressure control means. When the plug 30 is rotated so that the bore 35 interconnects passageway 29 and outlet 31, the steam region of enclosure 1 is connected to the external atmosphere. Hence during the heating-up stage, the plug 30 is rotated to such interconnecting position, and is rotated back to closed position only after all the air within the enclosure has been expelled, which moment is readily observable in that when steam pours from the outlet 31, then all of the air has been expelled. In this way any undesired displacement of the heating water into the riser tube 25 is avoided, while on closure of the plug 30 or reduction of the interconnection to a minimum value, or to an intermediate magnitude, the boiling water is expelled by the steam rapidly in the former cases, that is expresso mode of operation, and less rapidly to slowly in the latter case, that is dripcolator mode of operation.

Each mode of operation above described can be terminated as also interrupted repeatedly and as desired, by merely rotating the plug 30 so that it fully interconnects the bore 35 with the outlet 31 and the passageway 29. By so doing the generated steam within the enclosure streams into the external atmosphere, and hence its pressure is no longer available to continue the particular mode of operation of the apparatus.

It is to be particularly noted that with the opening defined by slits 7 and 8 at its minimum, to enable operation of the apparatus in the expresso mode as above described, the provision of plug 30 permits the practice of any dripcolator mode without varying such minimum opening setting of slits 7 and 8. The plug 30 need only to be rotated to, and maintained, at the position of the required degree of registration of bore 35 with passageway 29 and outlet 31, that the opening so defined plus the minimum opening of the slits 7 and 8 will cause to develop the required suitable pressure for the desired dripcolator mode. Concededly, this alternative method of adjustment is somewhat wasteful of the steam generated since a portion thereof will escape to the external atmosphere. When using the auxiliary funnel 36, however, this escaping steam is gainfully employed for preheating beverage containers as above described.

What I claim is:

1. Apparatus for the preparation of hot beverages comprising a closed compartment adapted to contain water having a free surface and air above the free surface, heating means adapted to bring the water within the compartment to its boiling point, a drain tube extending from within the top region of the compartment through the bottom region of the compartment, a closure member over the upper end of the drain tube and rotatable thereon and having a depending cylindrical portion snugly fitting the cylindrical surface of the drain tube, a riser tube opening into the drain tube immediately below the depending cylindrical portion of the closure member and extending with its lower open end close to but spaced from the bottom of the compartment, a circumferential slit through the depending cylindrical portion of the closure member, a circumferential slit through the drain tube registering with the slit through the depending cylindrical portion and adapted on rotation of the closure member to vary continuously the opening defined by the two slits from a predetermined minimum to a predetermined maximum, the predetermined minimum opening corresponding to that which on heating the water up to the boiling point will permit the air above the free surface to pass therethrough and equalize the pressure on the water in the compartment per se and on the water in the riser tube and on the generation of steam at the boiling point impedes to a maximum degree but not preventing the passage of steam therethrough so that the pressure of the rapidly increasing volume of steam being generated in the compartment acts primarily on the boiling water in the compartment per se to force all of it from the compartment through the riser tube end into the drain tube at a maximum rate of flow, the predetermined maximum opening defined by the two slits being such that on generation of steam the steam will readily pass therethrough unimpededly so that only steam flows into the riser and drain tubes, while at intermediate openings so defined the impedance thereof to the passage of the generated steam is progressively less the greater the opening while sufficient to cause a flow of the boiling water under the pressure of the rapidly increasing volume of steam being generated through the riser and drain tubes at rates of flow correspondingly less than the rate of flow of the boiling water at the minimum opening defined by the slits, and a perforated container positioned outside of the closed compartment below the lower open end of the drain tube and the closed compartment, the container being adapted to hold the beverage brewing ingredients.

2. Apparatus for the preparation of hot beverages comprising a water boiling compartment, means for heating the compartment to boil the water, a drain tube extending from the interior top region of the compartment through the compartment bottom and having a closed top and an open bottom end, a hollow cylindrical member snugly rotatable fitted to the upper portion of the cylindrical surface of the drain tube, a riser tube opening with its upper end into the drain tube below the cylindrical member and having its lower open end close to but spaced from the compartment bottom, a first slit through the cylindrical member, a second slit through the drain tube adapted to register with the first slit on rotation of the cylindrical member to vary continuously the opening defined by the two slits from a predetermined minimum to a predetermined maximum, the predetermined minimum opening corresponding to that which on heating the water up to the boiling point permits the expanding air in the compartment to maintain equal pressure on the water in the compartment per se and on the water in the riser tube and on generation of steam sufficiently impedes the passage of steam therethrough to permit the rapidly generated steam to act primarily on the boiling water in the compartment per se to force all of it above and at the lower open end of the riser tube rapidly through the open end of the riser tube and into the drain tube, the predetermined maximum opening being that at which on the generation of steam the latter will readily pass therethrough and through the drain tube while maintaining the boiling water in the compartment, and a perforated container for the solid brewing ingredients positioned below the open end of the drain tube.

3. Apparatus for preparing hot beverages comprising a closed compartment adapted to contain water, means for heating to boiling the water in the compartment, a riser tube within the compartment and having its lower open end adjacent to the bottom of the compartment, a drain tube extending from the upper interior region of the compartment through the bottom of the compartment, a closure member on the upper end of the drain tube and having a cylindrical portion fitting the upper end region of the cylindrical surface of the drain tube, a first elongated circumferential slit of a predetermined length through the cylindrical cover portion, a second elongated circumferential slit through the upper end region of the drain tube and adapted to be variably registered with the first elongated slit to define from a predetermined minimum to a predetermined maximum into the upper end region of the drain tube from the interior of the compartment, the upper end of the riser tube connecting the interior thereof to the interior of drain tube closely adjacent to and below the first and second slits, and a filtering means adapted to hold solid brewing ingredients below the compartment, the lower end of the drain tube opening above and adjacent to the top of the filtering means to direct the medium flowing through the drain tube through the filtering means.

References Cited in the file of this patent

UNITED STATES PATENTS

| | | |
|---|---|---|
| 642,322 | Goddard | Jan. 30, 1900 |
| 2,575,777 | Wilcox | Nov. 20, 1951 |

FOREIGN PATENTS

| | | |
|---|---|---|
| 28,463 | Great Britain | 1907 |
| 307,233 | Italy | Apr. 24, 1933 |
| 658,126 | Germany | Mar. 25, 1938 |
| 730,065 | France | May 3, 1932 |
| 747,411 | France | Mar. 28, 1933 |